Jan. 16, 1951        H. F. WILSON        2,538,638
MOLD FOR MAKING REFLECTORS
Filed Oct. 1, 1946        2 Sheets-Sheet 1
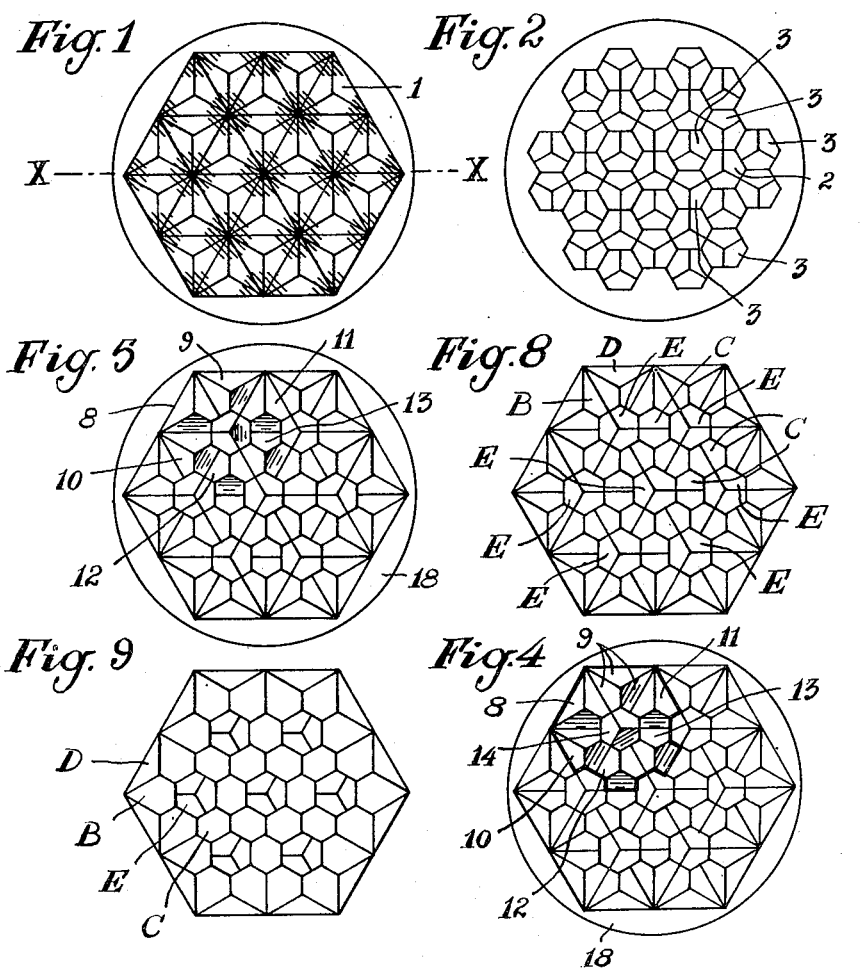
Herbert F. Wilson
Inventor
By Albert F. Nathan Atty Jan. 16, 1951        H. F. WILSON        2,538,638
MOLD FOR MAKING REFLECTORS
Filed Oct. 1, 1946        2 Sheets-Sheet 2
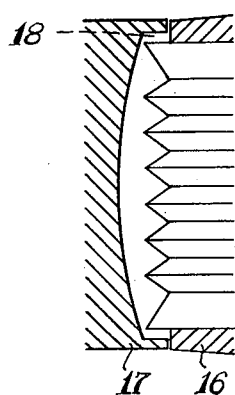
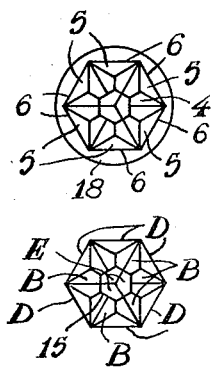
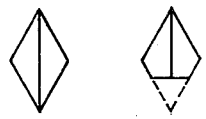
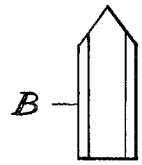

Patented Jan. 16, 1951

2,538,638

UNITED STATES PATENT OFFICE 2,538,638

MOLD FOR MAKING REFLECTORS

Herbert Frederick Wilson, Wembley, England

Application October 1, 1946, Serial No. 700,442
In Great Britain July 17, 1939

Section 1, Public Law 690, August 8, 1946
Patent expires July 17, 1959

3 Claims. (Cl. 49—72)

The present invention relates to molds for the manufacture of glass and other prismatic triple reflectors.

More particularly the present invention aims at improving those reflectors which comprise a plate of glass or mouldable synthetic plastic such as artificial resin, cellulose acetate or other suitable material on one face of which are right angled or substantially right angled triple reflectors forming tetrahedra which reflect incident light back to the source and also at improving the sectional moulds for forming such reflectors.

A known form of such reflector is one in which the triple reflectors are grouped to form a repeating geometric pattern consisting of recurring circular groups of six triple reflectors, the groups repeating in close order and the plan view of each group consisting of a six-sided figure which is a regular hexagon with one side of the triangular base of each six triple reflectors forming a side of the hexagon and the remaining sides of the bases of the triple reflectors, each of which sides is common to the base of an adjoining triple reflector meeting at a common point that is the centre of the hexagon.

It is found that at the centre of each hexagon-forming group there is a dark area which reduces the efficiency of the reflector as a whole.

In manufacturing triple reflectors in which the reflecting surfaces are all three at right angles or substantially at right angles to each other it is essential that the corresponding facet forming units in the mould be made with extreme optical accuracy and it is of importance that such facet forming units be produced economically and be capable of easy and rapid reconditioning.

A form of mould apparatus is described in British Patent No. 269,760 and the facet forming elements therein described have worked well for the production of reflectors in accordance with British Patents Nos. 233,002 and 270,790. Nevertheless the present invention enables improved facet forming mould elements to be produced having greater adaptability and in turn permitting the manufacture of improved reflectors.

To produce triangular-face reflectors in accordance with British Patent 233,002 and Fig. 11 of British Patent 269,760 the facet forming elements are cut from a diamond or half diamond shaped bar. In the case of diamond shaped elements two facets are cut at one end so that they intersect along the longer diagonal of the element each facet making an angle with the axis of the element of substantially 35 degrees 16 minutes. The outer half diamond elements have only one facet cut at the required angle.

When a number of such elements are assembled together in close formation to form a mould and the manufacture of triangular-face triple reflectors carried out in such mould the reflectors consist of a series of tetrahedra conforming to a pattern which cannot be varied without reducing the efficiency and with the disadvantage that in practice a substantial portion of each tetrahedron is non-reflecting as hereinbefore set forth.

The non-reflecting areas in such reflectors have been suppressed by cutting away each of the three base vertices of the tetrahedra and by the incorporation of similar additional triple reflectors in the centre of each group, but the mould hitherto used for a reflector of this character has been of a complicated nature, requiring an unduly large number of moulding elements.

The present invention enables the non-reflecting areas at the centre of each group to be readily suppressed and replaced by additional triple reflectors, without however necessitating so great an increase in the number of moulding elements as has been necessary in moulding the reflector of the kind previously proposed for minimising this difficulty.

The mould according to the present invention is composed as hitherto of an aggregation of faceted elements and in its simplest form in which it moulds one group, it comprises single-facet elements for forming the central triple reflector of the group a series of double facet elements forming a hexagonal aperture for these elements and a marginal series of facet elements completing the elements for moulding the group.

The marginal series may be single-facet elements which may form a continuous regular hexagon. The mould elements may be considered as derived from elements of diamond section, the marginal series being half-diamond section, i. e., triangular, the base of the triangle being the major axis of the diamond and forming one side of the hexagonal boundary, each of the three central single-facet elements being also of such half-diamond section but with the acute-angled vertices cut away to form a pentagon such that the three elements when assembled together form a hexagon, and the intermediate elements being of complete diamond section except that one of the acute-angled vertices is cut off to enable these intermediate elements when assembled to form a central hexagonal aperture to receive the three central single-facet elements.

Two or more of these groups may be arranged in any suitable disposition to form one reflector but where more than one group is provided we prefer that they should be so arranged that the base edges of the reflecting surfaces which form the outermost of the whole system form a single continuous hexagonal boundary and the mould for producing such a reflector comprises a central triad of single-facet elements, a marginal series of single-facet elements which define a continuous hexagonal boundary and a multiplicity of intermediate dual-facet elements so arranged as to form the central opening to receive the aforesaid central triad and to form also one or more series of openings around the central opening in which further similar triads are arranged. This mould may be composed of elements of the form previously described together with dual-facet elements of a section derived from diamond section by removing both the opposite acute-angled vertices. The central hexagonal opening containing the central triad may be formed of such latter elements only, and the openings containing the surrounding triads may be formed by (a) such latter elements (b) further dual-facet elements of the same section and (c) an outer series of dual-facet elements of diamond section with one only of the acute-angled vertices removed, the latter elements mating with the half diamond single-facet marginal elements which form the hexagonal boundary of the system of elements. Additional dual-facet elements may be provided for forming more than one circular series of triads of single-facet elements.

A simple form or reflector produced by a mould according to the present invention comprises a central triple reflector and a group of six surrounding triple reflectors, the base edges of the outer reflecting surfaces of which form a continuous hexagon. Alternatively, there may be a series of groups of seven triple reflectors which each include one central triple reflector, some of the reflectors being common to more than one group and the base edges of the reflecting surfaces which form the outermost of the system forming a continuous hexagon. For example, there may be one central group and six surrounding groups of seven triple reflectors, two of each surrounding group being tetrahedra with one base vertex only removed, two tetrahedra having two base vertices removed and the other two tetrahedra having each base vertex removed, the central reflector of each group being also a tetrahedron having all three base vertices removed.

Where a series of groups are provided some of the central reflectors are preferably orientated differently from others.

The reflector may be formed with an annular rib surrounding the triple reflectors and lying substantially flush with or extending above the tops of them.

The invention will be more readily understood by reference to the accompanying drawings, in which two known forms of reflector are illustrated as well as reflectors and moulds made by way of example according to the invention.

Fig. 1 is a plan view of a known type of reflector which gives rise to the aforesaid dark spots and Fig. 2 is a known form of reflector designed to obviate this difficulty but which has led to complications in the mould construction. Fig. 3 is a plan view of the simplest form of the reflector according to this invention and Fig. 4 is a plan view of another form of reflector according to this invention. Fig. 5 shows an alternative of the reflector according to Fig. 4. Fig. 6 is a top plan view and Fig. 7 an under plan view of a mould for making the reflector according to Fig. 3, and Figs. 8 and 9 are similar plan views of a mould for producing the reflector according to Fig. 4. Fig. 10 shows a top view of a known mould element. Figs. 11 and 12 show in plan and elevation respectively one of the mould elements used in the moulds according to Figs. 6 to 9; Figs. 13 and 14 are similar views of another mould element and Figs. 15 and 16 similar views of yet another mould element used in the said moulds. Figs. 17 and 18 are similar views of a further mould element which is used in the mould shown in Figs. 8 and 9. Fig. 19 is a sectional view through the sleeve and the companion component of the mould.

The known form of reflector shown in Fig. 1 shows recurring circular groups of six triple reflectors in the form of tetrahedra each tetrahedron 1 having an equilateral triangular base and the inner base vertices of the six tetrahedra meeting at a central point. As before stated, this form produces dark spaces approximately as indicated by the hatching in Fig. 1 of the drawings. These dark areas are eliminated in the known form shown in Fig. 2 where a central triple reflector 2 is provided within each group of six triple reflectors 3, each reflector being of a similar form to the tetrahedron in Fig. 1 but having the three base vertices cut away. The mould used for making this form of reflector has consisted of three separate single facet elements for each reflector and this has complicated the construction of the mould.

In the reflector shown in Fig. 3 which is the product of this invention there is one group of seven triple reflectors which are contained within a hexagonal boundary. The central reflector 4 is surrounded by six reflectors 5, all the base vertices of the tetrahedron from which the central one is formed being cut away but only the inner base vertices of the tetrahedra from which the surrounding ones are formed being removed so that the base edges of the outer reflecting surfaces 6 of all but the central reflector form a continuous hexagonal boundary. More than one of these groups may be provided in any suitable disposition but Fig. 4 shows a preferred form where there is a series of groups of seven triple reflectors around and completely overlapping the outer members of the central group. In this case the angles of the hexagonal figure that would normally be formed by the central group are interrupted by the intrusion of portions of triple reflectors which is consequence of the repetition and overlapping in the design illustrated form the central ones of the surrounding and overlapping series of reflectors each composed of seven. In order to facilitate the understanding of this construction, the boundaries of the members of one of the surrounding groups of seven reflectors has been emphasised in Fig. 4 and shading has been added, and it will be seen that two of each group, viz., 8 and 9 are tetrahedra with one base vertex only removed, two, viz., 10 and 11 are tetrahedra having two base vertices removed and the other two, viz., 12 and 13 are tetrahedra having each base vertex removed. The central reflectors 14 of the groups are also tetrahedra having all three base vertices removed.

Although the central reflectors of the various groups of seven may be similarly orientated as shown in Fig. 4 it is preferred to give them different orientations as, for example, is illustrated in Fig. 5. Various changes of orientation can obviously be obtained, that illustrated in Fig. 5 being merely by way of example.

The moulds according to the invention are constituted by a series of mould elements each one being either single faceted or dual faceted to correspond with a facet or facets of the triple reflectors. For producing reflectors as illustrated in Figs. 3, 4 and 5 we find it convenient to form these mould elements from a basic diamond section. In Fig. 10 the basic diamond is designated as A and the sections of the mould elements based thereon are shown in Figs. 11 to 18 as B, C, D and E. The mould elements B and C are dual faceted and the mould elements D and E single-faceted. The elements C are hexagonal with two opposite sides longer than the remaining sides. The elements B are in the form of an irregular pentagon, as also are the mould elements E. The element B is formed by removing the acute angle of the diamond at a portion situate one third of the length of the diagonal from one end thereof. Element C is formed by removing each acute angle of the diamond at a position situate one third of the length of the diagonal from the corresponding end thereof, while the base of the pentagon of the element E is made equal to the length of the base of the pentagon of element B and the long sides of the irregular hexagon of element C. In the mould construction shown in Figs. 6 and 7 the mould elements of the sections B, D and E are employed. The six dual facet elements B when assembled in a cluster or ring like group of six as shown form a central hexagonal aperture 15 which contains three single-facet elements E and the six single-facet elements D mate with the six elements B and form an external hexagonal boundary. To obtain the best dark area eliminating effect the distance between opposite sides of the hexagonal aperture should be one third of the distance between opposite sides of such external hexagonal boundary. The size of the reflectors resulting from the triad of elements E which fill such apertures substantially eliminates the whole of the dark area at the centre of each hexagonal group indicated in Fig. 1.

By the use of further dual-faceted elements of section C and a greater number of elements B, D and E and by re-arrangement, one central group of seven reflectors may be surrounded by overlapping series of additional groups, the whole system being contained within a hexagonal boundary. This formation is produced by the mould according to Figs. 8 and 9. The central group is in this construction formed of a central triad of elements E the hexagonal aperture for which is formed by six of the dual-faceted elements C. The latter co-operate with six further elements C, each adjoining two of the first series of elements C. With these elements C a surrounding series of the dual facet elements B may co-operate as shown to form a circular series of six further hexagonal apertures, each of which contains a triad of elements E while the mould is completed by a marginal series of twelve of the single facet elements D which define the hexagonal boundary of the mould.

In the form just described only the central group is composed entirely of hexagonal elements but two or more of such groups may be assembled together in a recurring overlapping pattern of the desired size and shape. More than one circular series of central triads of elements E can be built up in this way.

To hold together an assembly of either or both types of the described elements within the main portion of the mould it is necessary to utilise a split sleeve 16 constructed in two or more parts and preferably shaped to coincide with the contour of such assembly and held within appropriate retaining means.

The sleeved element 16 is preferably so constructed as illustrated in Fig. 19 that in erecting the mould elements the latter ride proud of the sleeve around them.

The companion portion 17 of the mould is so recessed that when both portions of the mould are brought together the reflector is formed with a surrounding wall 18 of material which extends level with or above the top of the triple reflectors and serves to protect the latter from injurious contact.

The reflectors may be moulded with the apices downwards especially when moulded from glass as in this way slumping is avoided and a more accurate representation of the mould is thereby obtainable than if the reflectors are moulded with the apices upwards. On the other hand, when moulding the reflectors from synthetic resin it has been found advantageous to mould the reflectors in a vertical plane, pressure of the plastic or molten material being maintained for a sufficient time to ensure the proper formation of the reflector in the mould.

The reflectors may be formed on the back of a convex lens as indicated by 17 in Fig. 19.

Another disadvantage of the form of reflector shown in Fig. 1 is its having thick continuous break lines such as that indicated by X—X along which the risk of fracture is liable to occur, for example, during the moulding process. This disadvantage is obviated in a reflector produced by the mould herein described.

I claim:

1. A mold for making reflectors consisting of triangular triple-reflecting pyramids with right-angled vertices and with at least one of the base angles removed and comprising multiple elements in an outline of regular hexagonal form, and composed of a marginal series of elements formed with a single inclined mold facet and defining the outline, an inner ring of elements formed with two inclined mold facets and of a diamond cross section with both acute angles removed, and which produce a central hexagonal aperture, and in combination therewith further of these elements and a surrounding ring of elements which mate with said marginal elements and are formed with two inclined mold facets and are of the same diamond cross section but with one only of the acute angles removed, thereby forming at least one series of hexagonal apertures on a hexagon around the central aperture, each of the said apertures being filled by a triad of single inclined facet mold elements which form a central pyramid within each of the overlapping clusters of six pyramids formed by the other elements.

2. A mold for making reflectors consisting of triangular triple-reflecting pyramids with right-angled vertices and with at least one of the base angles removed and comprising multiple elements in an outline of regular hexagonal form and consisting of a marginal series of elements formed with a single inclined mold facet and defining the outline, an inner ring of elements mating with said marginal series and formed with two inclined mold facets and of a diamond cross section with one acute angle removed and forming a central hexagonal aperture, said aperture being filled by a triad of single facet mold elements which form a central pyramid.

3. A mold according to claim 1, in which the triads of elements filling the said hexagonal apertures are differently orientated in the different apertures.

HERBERT FREDERICK WILSON.

REFERENCES CITED

The following references are of record in the file of this patent:

UNITED STATES PATENTS

| Number | Name | Date |
|---|---|---|
| 1,591,572 | Stimson | July 6, 1926 |
| 1,805,224 | Oestnaes | May 17, 1931 |
| 1,807,350 | Stimson | May 26, 1931 |
| 1,822,451 | Oestnaes | Sept. 8, 1931 |
| 1,848,675 | Stimson | Mar. 8, 1932 |
| 1,906,655 | Stimson | May 2, 1933 |
| 2,351,080 | Swarovski | June 13, 1944 |

FOREIGN PATENTS

| Number | Country | Date |
|---|---|---|
| 494,480 | Great Britain | Oct. 26, 1938 |